United States Patent Office 2,954,357
Patented Sept. 27, 1960

2,954,357

SILICONE COMPOUNDS AND ELASTOMERS PREPARED THEREFROM

Frank Fekete, Tonawanda, N.Y., assignor to Union Carbide Corporation, a corporation of New York No Drawing. Filed Aug. 7, 1957, Ser. No. 676,728

12 Claims. (Cl. 260—29.1)

This invention relates to organopolysiloxanes, of the type known as "silicone gums," suitable for use in the production of heat curable or vulcanizable silicone compounds. More particularly, this invention is concerned with silicone gums and with improved silicone compounds (or compositions) comprising the aforementioned silicone gums as new compositions of matter. The invention is further concerned with silicone elastomers produced by curing or vulcanizing the improved silicone compounds of my invention. This invention also contemplates the provision of processes useful in the production of my improved silicone compounds and elastomers.

By the term "silicone compound," as used herein, is meant a silicone composition comprising a mixture or blend of a silicone gum (a di-hydrocarbon-substituted polysiloxane) and an inorganic filler, which composition can also contain a curing agent.

According to most, or virtually all, heretofore customary procedures for producing silicone elastomers (silicone rubber products) commercially, silicone gums consisting essentially of dimethylpolysiloxanes, or of modified dimethylpolysiloxanes having pendant phenyl groups as well as methyl pendant groups, are compounded with inorganic fillers and curing agents on differential mixing rolls or in mixers, such as the Banbury mixer, of the type employed in compounding organic rubber stock to form mixtures known as "silicone compounds" which can be cured or vulcanized by the application of heat to silicone elastomers.

Silicone compounds containing highly-reinforcing silica fillers are, immediately after the compounding thereof, workable materials which can be readily shaped to a desired form or configuration. Curing of such silicone compounds immediately after the compounding and shaping thereof produces, for the specific recipe employed, an optimum combination of elongation and hardness properties in the resulting silicone elastomers. However, if after compounding, silicone compounds of the same recipe are bin-aged (stored or simply allowed to stand) for a period, as for example one week, they crepe-harden (or build up structure) to the extent that such compounds become hard and brittle. Before use, such bin-aged compounds must be regenerated to a workable material by remilling or remixing procedures. Curing of bin-aged and regenerated silicone compounds produces a combination of elongation and hardness properties in the resulting elastomers which are significantly poorer than the same properties of elastomers prepared from non-bin-aged compounds.

According to my experience, the longer the period of bin-aging, that is the longer the period that a compound is allowed to stand before curing, the greater the crepe-hardening (structure build-up) and the greater the decrease in the elongation and hardness properties of the resulting elastomer. The rate of structure build-up, as well as the rate of change in the above properties of the resulting elastomer, appear to increase with increases in the period of bin-aging up to a point of about two weeks after which both rates fall off to low values. Periods of bin-aging longer than about two weeks do not appear to result in further crepe-hardening of a compound or in further change in the properties of the resulting elastomer.

The exact cause for the changes which occur in silicone compounds during bin-aging is not precisely known or clearly understood. One possible explanation for such phenomena is that silicone compounds as produced are not inert compositions and reactions take place between reactive groups of the gum among themselves or with reactive groups present on the filler, when the compound is bin-aged. A second possible explanation is attributed to the basic difference in the nature of silicone gums and inorganic fillers which makes it difficult to obtain a thorough and intimate dispersion of the filler particles within the gum by compounding procedures. Structure build-up occurs when such compounds are bin-aged, because of coalescence among the non-completely dispersed filler particles.

To provide silicone compounds of a given recipe which, regardless of when a portion or all thereof is cured, will result in elastomers having essentially the same combination of elongation and hardness properties, compounders of such materials have of necessity undertaken the practice of bin-aging their compounds for a period of about two weeks before the sale or curing thereof. While such practices serve to stabilize the properties which characterize the cured compound, they attain this end at the expense of providing elastomers which do not possess their optimum combination of elongation and hardness properties. In addition, as bin-aging results in crepe-hardening of silicone compounds, such compounds must be remilled for periods of as long as 10 minutes and longer to provide a workable material suitable for shaping and subsequent curing operations.

It is an object of this invention to provide an improved silicone compound which does not require bin-aging to stabilize the properties of elastomers prepared therefrom and which silicone compound even if bin-aged does not crepe-harden or require extensive regeneration procedures to obtain a workable material.

The present invention is based on my discovery that improved silicone compounds, characterized by essential freedom from the disadvantages associated with bin-aging, can be prepared from compounds comprising a silicone gum, consisting of hydrocarbon-substituted polysiloxanes, and an inorganic filler by blending therewith an alkoxy-containing, hydrocarbon-substituted polysiloxanes, and an inorganic filler by blending therewith an alkoxy-containing, hydrocarbon-substituted polysiloxane oil. Based on my discovery, I have found that silicone compounds comprising a silicone gum, an alkoxy-containing polysiloxane oil, and a highly-reinforcing inorganic filler can be granulated, beaded or diced to a particle or pellet form and subsequently extruded, without the need of thereafter subjecting the particles or pellets to extensive remixing or remilling procedures, through extruding apparatus into various shapes or forms. I have further found that silicone elastomers produced by curing or vulcanizing the improved silicone compounds of this invention are characterized by an overall improvement in the physical properties thereof as compared with commercially available silicone elastomers.

The silicone gums which I employ in combination with an alkoxy-containing hydrocarbon-substituted polysiloxane oil to produce the improved silicone compounds of this invention are the hydrocarbon-substituted polysiloxanes whose hydrocarbon substituents comprise saturated hydrocarbon groups of one or more types and olefinically-unsaturated hydrocarbon groups of one or more types. In the production of the improved silicone compounds of the invention, the hydrocarbon-substituted polysiloxanes can be employed entirely as linear polysiloxanes, or, they may be employed partly as linear polysiloxanes and partly as cyclic polysiloxanes. When the olefinically-unsaturated hydrocarbon substituents are present in a linear polysiloxane, they are preferably present in limited, predetermined numbers, and they are disposed at spaced intervals along the linear polysiloxane chains. Such linear polysiloxanes can be prepared by copolymerization or coequilibration methods as well as by blending methods. Thus, for example, they may be prepared (1) by hydrolysis methods involving cohydrolysis of predetermined proportions of one or more dihydrocarbon-substituted dihalo- or dialkoxysilanes whose hydrocarbon substituents comprise one or more types of saturated hydrocarbon groups with one or more dihydrocarbon di-substituted dihalo- or dialkoxysilanes whose hydrocarbon substituents comprise one or more types of olefinically-unsaturated hydrocarbon groups, or (2) by coequilibration of predetermined proportions of one or more low molecular weight cyclic, hydrocarbon-substituted polysiloxanes whose hydrocarbon substituents comprise one or more types of saturated hydrocarbon groups with one or more low molecular weight cyclic hydrocarbon-substituted polysiloxanes whose hydrocarbon substituents comprise one or more types of olefinically-unsaturated hydrocarbon groups. Blending to achieve the effect of utilizing a linear hydrocarbon-substituted polysiloxane chain having both saturated and olefinically-unsaturated hydrocarbon substituents may be carried out. Thus, for example, they may be prepared by mechanically mixing one or more low molecular weight dihydrocarbon-substituted polysiloxanes whose hydrocarbon substituents comprise both saturated and olefinically-unsaturated hydrocarbon groups, which polysiloxanes contain at least two olefinically-unsaturated hydrocarbon groups to the molecule, with one or more types of linear polysiloxanes whose hydrocarbon substituents comprise saturated hydrocarbon groups. Such blends can also be prepared by mechanically mixing one or more linear polysiloxanes whose hydrocarbon substituents comprise one or more types of olefinically-unsaturated hydrocarbon groups in relatively small proportion with one or more linear polysiloxanes whose hydrocarbon substituents comprise one or more olefinically-unsaturated hydrocarbon groups in relatively large proportion.

I prefer to employ as the polysiloxane gum component, hydrocarbon-substituted polysiloxanes whose one or more saturated hydrocarbon groups consist of types selected from the class consisting of methyl, ethyl, and phenyl groups and whose one or more olefinically-unsaturated hydrocarbon groups consist of types selected from the class consisting of vinyl, allyl, and cyclohexenyl groups. The saturated hydrocarbon groups can be present as both of the hydrocarbon substituents of disubstituted siloxane units, or as single hydrocarbon substituents of disubstituted siloxane units, the other hydrocarbon substituents of which are olefinically-unsaturated hydrocarbon groups.

In practicing the invention, I can employ olefinically-unsaturated hydrocarbon-containing polysiloxane gums comprising or consisting of relatively short chain, low molecular weight linear polysiloxanes of chain lengths falling within a limited range, which gums are pourable liquids, or, I can employ siloxane gums of the same composition having higher viscosities, relatively longer chain lengths and relatively higher molecular weights up to the point at which the viscosity of the gum is such that it approaches the solid state and will barely flow when unconfined.

The alkoxy-containing, hydrocarbon-substituted polysiloxane oils which are employed in combination with my starting hydrocarbon-substituted polysiloxane gums and inorganic filler to produce the improved silicone compounds of this invention are essentially linear polysiloxanes whose hydrocarbon substituents comprise hydrocarbon groups, of one or more types and whose alkoxy substituents comprise alkoxy groups of one or more types. The alkoxy groups are present in limited predetermined numbers and are preferably bonded to the terminal silicon atoms of the polysiloxane chains comprising the oil. Such linear polysiloxane oils are known as alkoxy end-blocked polysiloxane oils and can be prepared by polymerization or by equilibration procedures. Thus, for example, they can be prepared by the coequilibration of a hydrocarbon-substituted polysiloxane oil, essentially free of alkoxy groups, whose hydrocarbon substitutents comprise one or more types of hydrocarbon groups with a predetermined amount of a relatively low molecular weight, alkoxy-containing silicon compound preferably having alkoxy substituents and hydrocarbon substituents (of one or more types) bonded to the silicon atom or atoms thereof in equal proportion.

I prefer to employ as the alkoxy-containing hydrocarbon-substituted polysiloxane oil component, polysiloxane oils whose one or more hydrocarbon groups consist of types selected from the class consisting of methyl, ethyl, vinyl, allyl, cyclohexenyl, and phenyl and whose one or more alkoxy groups consist of types selected from the class consisting of methoxy, ethoxy, propoxy and butoxy.

In producing the improved silicone compounds, I can employ any of the filler materials of the highly-reinforcing type consisting of inorganic compound, or any suitable combination of such filler materials, employed in the production of elastomers in accordance with heretofore customary procedures. I prefer to employ finely-divided silica-base fillers of the highly reinforcing type which are characterized by particle diameters of less than 500 millimicrons and by surface areas of greater than 50 square meters per gram. Inorganic filler materials of a composition, or of a particle diameter and surface area, other than those preferred, can be employed alone or in combination with the preferred fillers with good results. By way of illustration, such filler materials as titania, iron oxide, aluminum oxide, and the like, as well as those inorganic filler materials known as inert fillers which include, among others, diatomaceous earth, calcium carbonate and quartz are preferably employed in combination with highly-reinforcing silica fillers to lend substance or to body silicone elastomers produced for those applications requiring only small amounts of a highly-reinforcing silica filler.

Following are two lists of suitable fillers consisting of inorganic compounds, one setting forth filler names and properties and the other setting forth the filler names, and chemical compositions. These lists include filler materials of the type which can be employed in combination with the preferred silica fillers.

DESCRIPTION OF VARIOUS MATERIALS USED FOR ELASTOMER FILLERS

| Trade Name | Chemical Composition |
| --- | --- |
| Santocel-CS | Finely divided silica. |
| Aerosil or Cabosil | Finely divided very pure silica. |
| Hi-Sil X-303 | Finely divided silica. |
| Dicalite | Diatomaceous silica. |
| Superfloss | Do. |
| Celite 270 | Do. |
| Iceberg | Aluminum silicate. |
| Witcarb R | Calcium carbonate. |
| Zinc Oxide | Zinc Oxide. |
| Superpax | Zirconium silicate. |
| Titanox RA | Titania. |
| Lethopone | Barium sulfate-zinc sulfide. |
| FeO RY-2196 | Iron oxide. |
| Gamaco | Calcium carbonate. |
| Whitex | Aluminum silicate. |
| Valron | Finely divided silica having surface-bonded alkoxy groups. |

FILLER PROPERTIES

| Filler | Particle Diameter (millimicrons) | Surface Area, Sq. m. per gram | Approximate (ph) | Sp. Gr. |
| --- | --- | --- | --- | --- |
| Santocel CS | 30 | 110–150 | 3.4–4.5 | 2.2 |
| Hi-Sil X-303 | 20–25 | 140–160 | 7.0–8.0 | 1.95 |
| Degussa Aerosil | 15–20 | 175–200 | 3.0–5.0 | 2.0 |
| Valron | 8–10 | 285–335 | 6.0–7.5 | 1.86 |
| Witcarb R | 30–50 | 32 | 11.3 | 2.65 |
| Titanox RA | 300–400 | | 7.0 | 4.2 |
| Alon C | 20–40 | 50–120 | 4.5–7.0 | 3.6 |
| Gamaco | 100–150 | | | |

Referring particularly in an ethoxy end-blocked dimethylpolysiloxane oil, for convenience in describing my invention, the improved silicone compounds can be produced by blending or compounding a suitable starting silicone gum with an alkoxy-end-blocked dimethylpolysiloxane oil and a reinforcing filler on differential mixing rolls or in mixers, such as the Banbury Mixer, of the type employed in compounding organic rubber stock. The starting materials can be supplied to the mixing apparatus in any order, either all at once, or, when large amounts are to be compounded, they may be continually supplied to small increments.

One procedure for producing our improved compounds is first to charge the polysiloxane gum to the rolls of a milling apparatus or to a mixer and slowly adding the polysiloxane oil and fillers thereto. Adequate dispersion of the starting materials can be obtained by mixing or milling the ingredients for a period of from about eight or less to about twenty or more minutes.

Another valuable procedure involves forming a mixture of the polysiloxane gum and oil by compounding the ingredients on a mill or in a mixer and adding the filler to the mixture while in the mill or mixer. If desired, the mixture or blend of the alkoxy-end-blocked dimethylpolysiloxane oil and starting polysiloxane gum can be removed from the mixing apparatus, stored, and subsequently compounded with a filler to obtain the improved silicone compounds of this invention. Such mixtures of hydrocarbon-substituted polysiloxanes, whose hydrocarbon groups comprise saturated hydrocarbon groups and olefinically-unsaturated hydrocarbon groups and polysiloxane oils comprise improved silicone gum and constitute a part of my invention.

Curing agents employed to cure my improved silicone compounds can be simultaneously compounded with the gum, filler and oil, or they may be added to the improved compounds by a mixing procedure immediately prior to curing operations. The latter method or time for the addition of the curing agent is preferred when the organic peroxide employed is readily volatile.

The amount of an alkoxy-containing hydrocarbon-substituted polysiloxane oil that can be blended with the starting silicone gums to provide the improved gums of my invention is not narrowly critical and can vary by weight from as little as, or at least, four parts to as much as fifty parts and higher of the polysiloxane oil per one hundred parts of the silicone gum. I prefer to employ the polysiloxane oil in amounts which lie in the range of from about eight parts to about forty parts of the oil per one hundred parts of the gum.

When preparing the improved silicone compounds of this invention, the relative amount of the polysiloxane oil employed falls within the above range. However, this range can also be expressed in terms of a polysiloxane oil to reinforcing filler ratio present in the compound. Based on such terms, the polysiloxane oils can be employed in amounts by weight which provide a ratio of from 0.1 or less to as much as 1.0 parts or more of the oil per part of the highly-reinforcing filler present in the compound. Preferably, the polysiloxane oil and filler ratio will be in the range of from about 0.2 to about 0.8 part of the polysiloxane oil per part of the highly-reinforcing filler.

The silicone compounds of my invention are characterized by properties which, as far as is known, have not heretofore been attained. By way of illustration, the compounds can be allowed to stand or bin-age for periods as long as three months and longer without crepe-hardening and can be employed after such periods in shaping and curing operations without the need for extensive remilling or remixing procedures, although if desired, they can be subjected to several turns on a mill before use. In addition, silicone elastomers produced by curing my silicone compounds are characterized by improved physical properties as compared with presently commercially available elastomers. By way of illustration, the silicone elastomers of the invention possess improved tensile strengths and an improved combination of elongation and hardness properties. Moreover, bin-aging of my silicone compounds does not appear to exert a detrimental effect on the properties of elastomers produced therefrom.

Silicone elastomers produced in accordance with the instant invention find wide use in wire and cable insulations, as well as in vibration damping mounts, gaskets, seals, coatings and the like applications. When employed as tape coating materials, the resulting tapes are characterized by improved crease resistance.

Preparation of the starting hydrocarbon-substituted polysiloxanes (silicone gums) which contain both saturated and olefinically-unsaturated hydrocarbon groups may be carried out by means of any of the procedures whose fundamental principles are known to those skilled in the art. By way of illustration, such polysiloxanes can be produced by following a procedure involving (1) hydrolysis, on the one hand, of one or more hydrocarbon-substituted dichlorosilanes in which the substituents consist of saturated hydrocarbon groups to produce a crude hydrolyzate containing a mixture of linear and cyclic polysiloxanes, and, on the other hand, of one or more hydrocarbon-substituted dichlorosilanes whose hydrocarbon substituents comprise one or more olefinically-unsaturated hydrocarbon groups to produce a crude hydrolyzate containing a mixture of linear and cyclic polysiloxanes, (2) depolymerization of the crude hydrolyzates to form separate mixtures of low boiling, low molecular weight cyclic polymers (in one case having only saturated hydrocarbon pendant groups and in the other case having some olefinically-unsaturated hydrocarbon pendant groups) and undesirable material resulting from the virtually unavoidable presence of monofunctional and trifunctional chlorosilane starting material and (3) fractional distillation of the two products of depolymerization to vaporize and collect two pure products containing the low boiling, low molecular weight cyclic polymers free of any significant amount of monofunctional and trifunctional groups of molecules. I can utilize the two pure or relatively pure products obtained in the distillation treatment described above to produce a linear polysiloxane copolymer by mixing them in proportions such as to provide in the resulting linear polysiloxane a predetermined number of olefinically-unsaturated hydrocarbon groups with respect to the total number of hydrocarbon groups present therein, and subject the mixture to an appropriate equilibration treatment under controlled conditions to produce linear polysiloxanes of saturated and olefinically-unsaturated pendant groups attached to the silicon atoms thereof.

Thus, for example, in the production of a linear hydrocarbon-substituted polysiloxane gum useful as one of the starting materials, a polymer having methyl and vinyl groups bonded to the silicon atoms thereof may be produced by subjecting to hydrolysis a product comprising dimethyldichlorosilane (which product will, normally, be contaminated with about 0.3 percent to 0.7 percent by weight of monomethyltrichlorosilane) to produce a crude hydrolyzate containing polymerized dimethyl linear polysiloxanes, some cyclic dimethylpolysiloxanes as well as undesirable materials resulting from the presence in the dimethyldichlorosilane material of monomethyltrichlorosilane. The crude hydrolyzate, subsequently, is subjected to a depolymerization treatment by mixing it with potassium hydroxide (KOH) and diphenyl solvent in the proportions, by weight, 39 parts of the crude hydrolyzate, 1.0 part of potassium hydroxide and 60 parts of diphenyl solvent, and heating the mixture at a temperature in the range, 150° C. to 175° C. under an absolute pressure of 100 mm. Hg to produce and remove by vaporization a product consisting of low molecular weight cyclic polysiloxanes, comprising, for example, about eighty-five percent (85%) of the tetramer $[(CH_3)_2SiO]_4$ and fifteen percent (15%) of mixed trimer $[(CH_3)_2SiO]_3$ and pentamer $[(CH_3)_2SiO]_5$. Materials resulting from the presence of monomethyltrichlorosilane ($MeSiCl_3$) in the initial product containing dimethyldichlorosilane remain as a residue in the distillation vessel or tower.

The distillate consisting essentially of low molecular weight cyclic dimethyl polymers, free of any significant amount of monofunctional and trifunctional groups or molecules, is prepared for a controlled equilibration treatment in a mixture by mixing the distillate with (1) one or more cyclic ethyl vinyl polysiloxanes, such, for example, as the trimer, $[(C_2H_5)(CH_2=CH)SiO]_3$ or the tetramer $[(C_2H_5)(CH_2=CH)SiO]_4$ or both, (2) potassium silanolate,

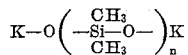

in an amount sufficient to provide thirty (30) parts by weight of potassium ion (K+) per million parts by weight of the distillate and (3) an amount of one or more monofunctional compounds calculated to function as endblockers for limiting the degree of polymerization and, consequently, the lengths and molecular weights of the linear polysiloxane chains and for stabilizing the polymers. After thorough stirring in order to effect thorough dispersion of the components and the production of a substantially homogeneous product, the mixture is heated in a sealed vessel at a temperature of about 150° C. for a period of time varying from about one hour to two and one-half hours. The degree of completion of the polymerization reactions is determined through viscosity measurements or miniature penetrometer readings. The elimination of residual trifunctional compounds, also, is promoted by the use of monofunctional compounds in accordance with our invention.

Monofunctional compounds that may be employed satisfactorily for controlling polymer growth include, among others,

| Hexamethyldisiloxane | $(CH_3)_3SiOSi(CH_3)_3$ |
| --- | --- |
| Tetramethyldiethoxysilane | $(CH_3)_2(C_2H_5O)SiOSi(OC_2H_5)(CH_3)_2$ |
| Monoethyltriethoxysilane | $C_2H_5Si(OC_2H_5)_3$ |
| Diethyltetraethoxydisiloxane | $C_2H_5(C_2H_5O)_2SiOSi(OC_2H_5)_2C_2H_5$ |
| Tetramethyldimethoxyethoxydisiloxane | $(CH_3)_2CH_3OC_2H_4OSiO SiOC_2H_4OCH_3(CH_3)_2$ and |
| Divinyltetraethoxydisiloxane | $CH_2=CH(C_2H_5O)_2SiO Si(OC_2H_5)_2CH_2=CH_2$ |

Hydrocarbon-substituted polysiloxanes whose pendant groups consist largely of methyl groups and include additional saturated hydrocarbon groups other than or in addition to ethyl groups and olefinically-unsaturated hydrocarbon groups other than or in addition to vinyl groups can be produced by means of procedures similar to that described above or by means of procedures modified in accordance with known characteristics of the various hydrocarbon groups sought to be included.

Processes employed in producing the starting silicone gums, consisting of hydrocarbon groups comprise saturated and olefinically-unsaturated hydrocarbon groups, preferably are so controlled as to produce gums having R (saturated hydrocarbon) R' (olefinically-unsaturated hydrocarbon) siloxane units disposed along the linear polysiloxane chains in amounts in the range of 0.037 to 0.70 mole-percent (equivalent to about 0.05 to 1.0 wt.-percent) of the total number of moles contained in the linear polysiloxane chains. That is, from 0.037 to 0.70 percent of the silicon atoms of the starting polysiloxanes are bonded to olefinically-unsaturated hydrocarbon groups. The introduction into the polysiloxane chains of the numbers of olefinically-unsaturated hydrocarbon groups indicated contemplates the provision of sufficient numbers of such groups to provide for the development, upon curing, of approximately 5 to 20 cross-links per molecule through the olefinically-unsaturated groups. It is to be understood that we may provide olefinically-unsaturated hydrocarbon groups in my starting silicone gums in greater or lesser numbers to provide ultimate cured elastomers of modified properties. Oftentimes it may be desirable to effect cross-linking of such gums through agencies in addition to or in place of a portion of the unsaturated groups present therein. Such can be accomplished by providing for the use of curing agents, in appropriate amounts, which have the capacity to effect cross-linking through other agencies, as for example, methyl to methyl groups, as well as the capacity to effect cross-linking through unsaturated groups. Catalysts suitable for use in curing the improved gum stocks of the invention are hereinafter more fully disclosed.

The polysiloxane gums employed are preferably produced under conditions so controlled as to avoid (1) the incorporation therein of any significant amounts of trifunctional compounds, groups, or molecules to avoid cross-linking of linear polysiloxane chains through silicon and oxygen atoms and (2) the incorporation therein of any significant amount of monofunctional compounds, groups, or molecules other than those specifically provided to serve as end-blockers for limiting the degree of polymerization. Accordingly, my starting polysiloxane gum contains hydrocarbon pendant groups and silicon atoms in the ratio of 2.0 hydrocarbon groups per silicon atoms (approximately). Deviation from a ratio of 2 in any instance, as for example, ratios of from about 1.95 to about 2.05, with respect to the preferred particles will be insignificant for all practical purposes since it will be attributable to the presence of end-blocking hydrocarbon groups whose total numbers will be insignificant as compared with the total numbers of hydrocarbon groups attached to silicon atoms of linear polysiloxane chains.

Preparation of the alkoxy-containing hydrocarbon-substituted polysiloxane oils employed in the present invention can be carried out by (1) producing one or more types of cyclic dihydrocarbon-substituted polysiloxanes from one or more types of dihydrocarbon-substituted dichlorosilanes or dialkoxysilanes in accordance with the hydrolysis, depolymerization and fractional distillation procedures described in detail above, (2) utilizing one or more types of the cyclic siloxanes so produced to form a mixture with predetermined amounts of a dihydrocarbon-substituted dialkoxysilane and subjecting this mixture to an equilibration treatment under controlled conditions to produce the desired alkoxy end-blocked, hydrocarbon-substituted linear polysiloxane oil.

Thus, for example, in the production of a linear alkoxy end-blocked hydrocarbon-substituted polysiloxane oil, in which the alkoxy groups are ethoxy groups and the hydrocarbon groups are methyl groups, suitable for use in the invention, one mole of the cyclic tetramer of dimethylsiloxane and one mole of dimethyldiethoxysilane are mixed with a suitable catalyst and placed within a pressure vessel and heated to a temperature of about 200° C. for a period of time of about 2 hours to obtain a low-molecular weight dimethylpolysiloxane oil having an average of one ethoxy group bonded to each of the terminal silicon atoms thereof.

Processes of the above type for producing the alkoxy end-blocked dihydrocarbon-substituted oils employed in this invention are disclosed and claimed in copending United States application, D. L. Bailey, Serial No. 398,225, filed December 14, 1953, now U. S. Patent No. 2,909,549.

The alkoxy-containing hydrocarbon-substituted polysiloxane oils suitable for use in the present invention are those relatively low molecular weight polysiloxane oils whose polymer chains have at least four and as much as thirty-five and more dihydrocarbon siloxy units ($R_2SiO$) per molecule and which contain an average of at least two and not more than four alkoxy groups to the molecule. Preferably starting polysiloxane oils have an average of at least one and not more than two alkoxy groups bonded to each of the terminal silicon atoms of the molecule. Most suitable for use are those alkoxy end-blocked dihydrocarbon polysiloxane oils having from eight to twenty dihydrocarbon siloxy units per molecule and having an average of from 1 to 1.5 alkoxy groups bonded to each of the terminal silicon atoms thereof.

Referring particularly to an ethoxy end-blocked dimethylpolysiloxane oil for purposes of illustration such oils have a molecular weight of from about 400 to about 2700, preferably from about 600 to about 1500 and contain terminal ethoxy groups in an amount by weight of the oil of from about 5 to 25 percent, preferably from about 8 to 20 percent. Of course, when the alkoxy end-blocked dihydrocarbon polysiloxane oil contains hydrocarbon substituents other than, or in addition to, methyl groups the molecular weight thereof would be higher than that disclosed above for the dimethylpolysiloxane oils. In a like manner the alkoxy content in terms of percent by weight of the oil will be smaller. Alkoxy end-blocked dihydrocarbon polysiloxane oils whose hydrocarbon substituents comprise groups other than methyl groups and whose alkoxy groups comprise groups other than ethoxy groups can be prepared in a manner similar to that described above for ethoxy end-blocked dimethylpolysiloxane oils.

In producing improved silicone elastomers in accordance with my invention, I can use any of the curing agents consisting of the organic peroxides employed in the production of elastomers with heretofore customary procedures. The preferred curing agents are those organic peroxides which effect curing of the improved compounds, selectively and preferentially, through the agency of the unsaturated hydrocarbon groups present in the polysiloxane gum. Especially suitable for this purpose are the dialkyl peroxides which can be graphically depicted by the structural formulas:

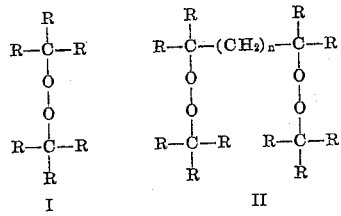

wherein R represents the same alkyl group throughout or alkyl groups of two or more different types and $n$ is zero (0) or a larger integer.

Among the specific curing agents that we prefer to employ are included: Di-tertiary-butyl peroxide, tertiary-butyl-triethylmethyl peroxide; and tertiary-butyl-tertiary-triptyl peroxide, the composition of which is represented by the structural formula:

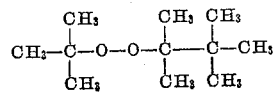

and substituted di-tertiary alkyl peroxides such as dicumyl peroxide.

I can also employ as curing agents, other organic peroxides, which effect curing through the agency of the unsaturated groups, as well as other groups, present in the polysiloxane gum. Such organic peroxides, when employed in appropriate amounts, will effect the same degree of curing of our improved silicone compounds through the same agencies or through agencies in addition to the unsaturated groups, as for example, through methyl to methyl groups. In such instances not all of the unsaturated groups present necessarily enter into cross-linking reactions. Typical of such peroxides are the aryl peroxides which include benzoyl peroxide, and the like, mixed alkyl-aryl peroxides which include tertiary-butyl perbenzoate and the like, chloroalkyl peroxides such as 1,4-dichlorobenzoyl peroxide; 2,4-dichlorobenzoyl peroxide, mono-chlorobenzoyl peroxide and the like.

The improved silicone elastomers of our invention can be produced by adding an olefinically-unsaturated hydrocarbon-containing polysiloxane gum, an alkoxy end-blocked hydrocarbon polysiloxane oil together with an appropriate amount of filler and catalyst to a two-roll mill and milling the ingredients until the oil, filler and catalyst are thoroughly dispersed within the gum. By way of illustration, in preparing a highly-reinforcing silicone compound suitable for use as a general purpose stock, 100 parts of a linear polysiloxane copolymer consisting essentially of dimethylsiloxane units (99.75 percent by weight) and ethyl vinyl siloxane units (0.25 percent by weight=0.185 mole percent) is milled with 45 parts of a finely divided silica, 15 parts of an ethoxy end-blocked dimethylpolysiloxane oil (molecular weight 880 containing 10 percent by weight of ethoxy groups) and 1 part of ditertiary-butyl peroxide (all parts by weight) for a period of about 15 minutes. The resulting silicone compound is removed from the mill, fed to a mold, and is cured by heating to a temperature of about 340° F. for a period of 20 minutes.

In accordance with heretofore customary practices the amount of highly-reinforcing silica employed with silicone gums to produce silicone compounds and silicone elastomers depends upon the tensile strength as well as on the hardness properties desired in the elastomer. By way of illustration, where high tensile strength and high hardness values are required, the filler employed will comprise for the most part a highly-reinforcing silica and can contain small amounts of other types of filler materials. In the production of silicone elastomer tape coatings or silicone elastomer cable compounds, where high tensile strengths and high hardness values are not as important, lesser amounts of highly-reinforcing silica can be employed together with larger amounts of other types of fillers.

When the highly-reinforcing silica fillers employed in this invention are highly acidic in nature as for example having a pH of 4 or less, it is oftentimes desirable to add thereto or to the silicone compounds, materials which tend to neutralize the effects caused thereby. In such instances buffers such as the alkaline earth compounds, including calcium zirconate, barium zirconate and the like, can be added in appropriate amounts to the filler or to the mixture of silicone gum, polysiloxane oil and silica filler during compounding.

I have found that the improved silicone compounds of my invention possess the advantageous property of forming pseudo- or semi-stiffened materials which can be granulated, cut or diced into granules, pellets, or cubes. Furthermore, I have found that when my improved silicone compounds are in such form their surfaces are tack-free and they can be stored for periods of time as long as six months and longer and still remain in this state. Such granulated, pelleted or diced silicone compound materials can be directly employed in extruding or molding operations without the necessity of reworking as by remilling or remixing procedures. By way of illustration, a diced silicone compound within the scope of the invention after bin-aging for a period of three weeks was fed to an extruder apparatus without remilling and extruded about an electrical conductor.

The amount of filler present in the improved silicone compounds which can be cubed or diced into pellet form is not narrowly critical and can vary over a wide range. The filler employed can comprise only highly-reinforcing silica or mixtures of such reinforcing silicas with other filler materials as for example calcium carbonate, quartz and the like. Silicone compounds containing as little as 10 parts by weight of a highly-reinforcing silica and larger amounts of other filler materials have been extruded and cut into cylindrical forms of one-sixteenth inch in diameter and one-quarter inch length, stored for three months and directly extruded about an electrical conductor.

In producing elastomers in accordance with this invention, I prefer to subject the improved silicone compounds that have been milled or otherwise mixed to disperse the filler, polysiloxane oil and curing agent in the polysiloxane gums to mold curing (or heat curing) treatments at temperatures above 300° F. (preferably 340° F. or higher) for periods of time longer than 15 minutes (preferably 20 minutes or longer) and thereafter to subject the cured elastomer to heat aging treatments at high temperatures in air-circulating ovens for periods of time sufficiently long to permit effective elimination through vaporization of objectionable inclusions such as water, residues from curing agent reactions and low molecular weight gum stock fractions. Heating of the cured products to a temperature of about 480° F. through or during a period of about 24 hours usually is effective for eliminating such undesirable inclusions.

In some instances it may be desirable to subject a mixture of the polysiloxane gum, alkoxy-containing polysiloxane oil and filler (free of the curing agent) to precure heat aging at an elevated temperature above about 250° F. and up to 300° F. and higher for a period of time ranging from one to two or more hours. This type of precure aging provides opportunities for better wetting of the fillers by the gums. In addition, the precure heat aging treatment provides the further advantage of effective elimination of objectionable volatile matters, such as water and adsorbed gases carried into the compounds by the fillers.

At the conclusion of the precure aging treatment, the curing agent is incorporated into the compound to produce my heat-curable silicone compounds and thereafter such compounds are heat cured with the heat cured product being subjected to a postcured heat aging treatment.

Precure heat aging treatments are not essential but may be employed with a compound comprising any suitable filler, polysiloxane oil and gum. The precure aging permits the elimination of volatile matters at a stage wherein distortion resulting from gas elimination is not harmful and reduces the amount of gas that must be eliminated in the postcured heat aging with consequent reduction in the amount that must be eliminated at the critical time when density and structural form must be retained.

The following examples described the improved silicone gums, compounds and elastomers of our invention as well as processes for their production. In the examples the following terms and expressions where employed are to be interpreted as indicated below.

GLOSSARY

A. Miniature penetrometer

The miniature penetrometer used in determining the hardness of silicone gums is a modification of the standard miniature penetrometer used in measuring the hardness or viscosity of a plastic substance, such as asphalt, made in accordance with suggestions contained in the article "Miniature Penetrometer for Determining the Consistency of Lubricating Greases" by Kaufman, Gus; Finn, W. J. and Harrington, R. J., Industrial and Engineering Chemistry, Analytic Edition, 11, 108–110 (1939).

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

Silicone gum is tested for hardness by lowering the penetrometer cone with the plunger into contact with the surface of the gum with the indicator reading zero. Then the penetrometer cone with its plunger is released to permit downward movement under the influence of gravity for a period of 10 seconds, and the depth of penetration is shown in millimeters on an indicator associated with the device. The indicated penetration is identified as the miniature penetrometer reading (MPR).

B. Compression set

Degree of failure of a sample to return to its original size after removal of a deforming force.

Compression set tests are run by compressing a 1.129 inch diameter × 0.500 inch high cylindrical specimen either under a constant load, Method A, or at a definite fixed deflection, Method B. After the specimen has been compressed, it may be subjected to an elevated temperature for a fixed time, (usually 22 hours, at 70° C.), then the load is released; after a 30 minute rest, the permanent change in the height of the specimen is measured and the percent set calculated. A small value is desirable.

Compression set is expressed as percent of original deflection in Method B.

Compression set is expressed as percent of original thickness in Method A.

C. Elongation

Amount of stretch of a sample under a tensile force expressed as a percentage of the original length.

$$\frac{(\text{Stretched length} - \text{original length})}{\text{Original length}} \times 100$$

D. Hardness

Degree of indentation produced by a plunger or indentor under a specific load. Measured with a Short A Durometer. The values range from 0 to maximum hardness of 100.

E. Tear strength

Similar to tensile test, except that a different "right angle" or "C" dumbbell shape is used. Sample tears at the right angle. Force required to tear specimen divided by thickness is tear strength (lb./in.).

F. Tensile strength

The force necessary to rupture a rubber specimen when stretched to the breaking point divided by the original cross sectional area (lb./sq. in.).

G. Crease strength

The force necessary to break or rupture a cured silicone compound-treated cloth along a crease parallel to the warp of the specimen. The crease is imparted to the specimen by folding a piece of cloth, at least 6 inches in length, end to end and lowering thereon a 2-kilogram weight at a rate of 12 feet per minute. The weight is allowed to remain at rest on the folded cloth for a period of 2 seconds and removed, after which the specimen is unfolded with each end thereof placed in a clamp of a Thwing Albert or a Scott Tester. The tester applies a pulling force at the rate of one-half pound per minute and a reading, in terms of pounds, taken when the specimen breaks along the crease. The number of pounds divided by the width in inches gives the crease strength in pounds per inch.

H. Dielectric strength

In accordance with ASTM–D149–44. For coated fabrics in terms of volts per mill.

I. Remill time

The time required to rework or remill a bin-aged silicone compound to a readily formable material which can be charged to a mold or extruded (min.).

EXAMPLE I

A relatively soft ethoxy end-blocked gum comprising linear polysiloxanes consisting of dimethylsiloxane units (99.65 percent by weight=99.7 mole-percent) ethyl vinyl siloxane units (0.35 percent by weight=0.26 mole-percent) was prepared by mixing 29,800 grams of octamethylcyclotetrasiloxane with 4 grams of tetramethyldiethoxydisilane and 300 grams of a polysiloxane copolymer consisting of ethyl vinyl siloxane units (28 percent by weight) and dimethylsiloxane units (72 percent by weight), stirring to mix the components thoroughly; heating the mixture to a temperature of 145° C.; adding as a catalyst a solution of potassium silanolate in an amount sufficient to provide 30 parts of potassium ion per million parts of the mixture; again stirring for 10 minutes and then heating the resultant mixture in a sealed vessel to a temperature of 150° C. for an hour and forty-five minutes. After the conclusion of the heating period, the vessel was permitted to stand overnight to allow cooling of the contents thereof to room temperature. The linear polysiloxane gum contained in the cooled vessel had a hardness corresponding to a miniature penetrometer reading of 78 at room temperature. The polymer was soluble in toluene and had a pendant hydrocarbon group to silicon atom ratio of 2.0 (approximately).

An ethoxy end-blocked dimethylpolysiloxane oil containing an average of one ethoxy group bonded to each of the terminal silicon atoms of the polysiloxane chains thereof was prepared by first, heating, while stirring, a mixture of 700 grams of dimethyldiethoxysilane and 2750 grams of a mixture of cyclic dimethylsiloxanes including the cyclic trimer, tetramer, and the like, to a temperature of 80° C., then adding to the mixture 3.5 grams of tetramethyl ammonium hydroxide dispersed in 50 grams of cyclic dimethylsiloxanes (equivalent to a potassium ion concentration of 20 parts per million parts of the overall mixture), heating the newly formed mixture at a temperature of 85° C. for 2½ hours and then at a temperature of 200° C. for 3½ hours. After heating, the mixture was allowed to cool to room temperature, filtered, and the product obtained comprised 3065 grams of an ethoxy end-blocked dimethylpolysiloxane oil having a molecular weight of 880 with an average of one ethoxy group per terminal silicon atom and the ethoxy groups comprising 10 percent by weight of the oil.

Starting with the polysiloxane gum prepared above consisting of dimethylsiloxane units and ethyl vinyl siloxane units, two silicone compounds of Recipe "A" and Recipe "B" were prepared by compounding procedures conducted on a two-roll mill.

Recipe "A"

100 parts of polysiloxane gum
40 parts of finely divided silica (Cab-O-Sil)

Recipe "B"

100 parts of polysiloxane gum
40 parts of finely divided silica (identical with that employed in Recipe "A")
15 parts of ethoxy end-blocked dimethylpolysiloxane oil (M.W.=880, 10 percent ethoxy groups as shown above)

The siloxane compounds were allowed to bin-age for a period of two weeks after which time each compound was placed on a two-roll mill to (1) rework the compound to a readily formable material and (2) to compound 1.2 parts of di-tertiarybutyl peroxide therein, with the time required to conduct steps 1 and 2 recorded. After the incorporation of the catalyst in the compounds, they were placed in a mold and heat cured at a temperature of 340° F. for a period of 20 minutes and post-cured in an air-circulating oven at a temperature of 480° F. for a period of 24 hours. The time required for reworking of the silicone compounds and the properties of the resulting elastomers appear in the following table:

Table I

| | Remill Time (min.) | Post Cured Properties | | | |
|---|---|---|---|---|---|
| | | Hardness (Shore A) | Tensile (p.s.i.) | Elongation (percent) | Tear "Die C" (lb./in.) |
| Recipe "A" | 13 | 76 | 915 | 200 | 75 |
| Recipe "B" | <0.1 | 68 | 910 | 340 | 90 |

Recipe "B" prepared in accordance with the instant invention did not require remilling to obtain a workable or formable material but was milled only to the extent (less than 0.1 sec.) necessary to disperse the catalyst within the compound. On the other hand, Recipe "A," which is free of polysiloxane oil, required a period of 13 minutes to obtain a workable or formable material as well as to obtain a dispersion of the catalyst within the compound. The elastomer prepared from Recipe "B" is also characterized by improved elongation and tear strength values as well as by an improved combination of elongation and hardness properties as compared to the elastomer prepared from Recipe "A."

EXAMPLE II

Starting with the polysiloxane gum consisting of dimethylsiloxane units and ethyl vinyl siloxane units described in Example I, silicone compounds of recipes "C," "D" and "E" were prepared in accordance with the invention. The recipes were prepared by adding the ingredients to a two-roll mill. The recipes differ in the ethoxy content of the alkoxy end-blocked dimethylpolysiloxane oil and in the amount of filler.

Recipe "C"

100 parts of polysiloxane gum
40 parts of finely divided silica (Cab-O-Sil)
15 parts of ethoxy end-blocked dimethylpolysiloxane oil (containing an average of one ethoxy group per terminal silicon atom with the ethoxy groups comprising 17.3 percent by weight of the oil)

Recipe "D"

100 parts of polysiloxane gum
50 parts of finely divided silica (Santocel "CS")
15 parts of ethoxy end-blocked dimethylpolysiloxane oil (containing an average of one ethoxy group per terminal silicon atom with the ethoxy groups comprising 10 percent by weight of the oil and having a molecular weight of 880)

Recipe "E"

100 parts of polysiloxane gum
45 parts of finely divided silica (Santocel "CS")
15 parts of ethoxy end-blocked dimethylpolysiloxane oil (containing an average of two ethoxy groups per terminal silicon atom with the ethoxy groups comprising 8.2 percent by weight of the oil)

The silicone compounds were allowed to bin-age for a period of 2 weeks after which 1.2 parts of di-tertiarybutyl peroxide was compounded with each of the recipes on a two-roll mill with the milling time required to disperse the catalyst and work the material recorded. The compounds were cured as in Example I and the properties of the cured elastomers listed below together with the time required for remilling.

*Table II*

|  | Remill Time (min.) | Post Cured Properties ||||
|---|---|---|---|---|---|
|  |  | Hardness (Shore A) | Tensile (p.s.i.) | Elongation (percent) | Tear "Die C" (lb./in.) |
| Recipe "C" | <0.1 | 68 | 910 | 340 | 90 |
| Recipe "D" | <0.5 | 70 | 1,050 | 360 | 85 |
| Recipe "E" | <1.0 | 67 | 1,150 | 340 | 85 |

All of the above compounds which were prepared by the process of the invention did not require remilling to obtain a workable or formable material. The remilling time recorded is that time required to disperse the catalyst within the compound.

EXAMPLE III

Starting with the polysiloxane gum consisting of dimethylpolysiloxane units and ethyl vinyl siloxane units described in Example I, silicone compounds of Recipes "F," "G," "H," "I," "J," and "K" were prepared by compounding procedures conducted on a two-roll mill. The filler employed was a finely divided highly-reinforcing silica (Santocel "CS") and the polysiloxane oil employed in Recipes "G," "I," and "K" is an ethoxy end-blocked dimethylpolysiloxane oil (which contains an average of two ethoxy groups per terminal silicon atom with the ethoxy groups comprising 8.2 percent by weight of the oil).

| Recipe | Parts of Gum | Parts of Santocel "CS" | Parts of Ethoxy End-blocked oil |
|---|---|---|---|
| F | 100 | 35 | 0 |
| G | 100 | 35 | 15 |
| H | 100 | 45 | 0 |
| I | 100 | 45 | 15 |
| J | 100 | 55 | 0 |
| K | 100 | 55 | 15 |

The silicone compounds were allowed to bin-age for a period of 3 weeks after which 0.8 parts of ditertiarybutyl peroxide was compounded with each of the recipes on a two-roll mill with the milling time required to disperse the catalyst and to obtain a readily formable material recorded. The compounds were charged to a mold and cured for a period of 20 minutes at a temperature of 340° F. and subsequently post-cured for a period of 20 hours at a temperature of 480° F. The properties of the cured compounds are listed below together with the time required for remilling.

*Table III*

|  | Remill Time (min.) | Hardness (Shore A) | Tensile (p.s.i.) | Elongation (percent) | Compression (percent) | Tear "Die C" (lb./in.) |
|---|---|---|---|---|---|---|
| Recipe "F" | 4.0 | 57 | 900 | 250 | Nil | 58 |
| Recipe "G" | 0.5 | 58 | 855 | 350 | Nil | 80 |
| Recipe "H" | 6.0 | 68 | 955 | 195 | Nil | 62 |
| Recipe "I" | 1.0 | 67 | 1,150 | 340 | Nil | 86 |
| Recipe "J" | 6.0 | 75 | 945 | 160 | Nil | 54 |
| Recipe "K" | 2.0 | 72 | 1,040 | 270 | Nil | 83 |

The siloxane compounds of Recipes "G," "I," and "K," prepared in accordance with the invention did not require remilling to obtain a workable or formable material, but instead were milled only to the extent required to obtain a dispersion of the catalyst within the compound. On the other hand, silicone compounds prepared from Recipes "F," "H," and "J" (which are free of polysiloxane oil) required periods of from 4 to 6 minutes to obtain a workable or formable material as well as to obtain a dispersion of the catalyst within the compounds. In addition the elastomers prepared in accordance with our invention possess improved combination of elongation, tensile strength, hardness and tear resistance properties as compared with those elastomers free of polysiloxane oil.

EXAMPLE IV

A linear polysiloxane gum consisting of dimethylsiloxane units (87.85 percent by weight) ethyl vinyl siloxane units (0.15 percent by weight) and diphenylsiloxane units (12.0 percent by weight) was employed as the starting gum in the preparation of silicone compounds of Recipes "L" and "M."

*Recipe "L"*

100 parts of polysiloxane gum
40 parts of finely divided silica (Santocel "CS")

*Recipe "M"*

100 parts of polysiloxane gum
40 parts of finely divided silica (Santocel "CS")
15 parts of ethoxy end-blocked dimethylpolysiloxane oil (containing an average of two ethoxy groups per terminal silicon atom with the ethoxy groups comprising 8.2 percent by weight of the oil)

The silicone compounds were allowed to bin-age for a period of 3 weeks after which 1.2 parts of di-tertiarybutyl peroxide was compounded with each of the recipes on a two-roll mill with the milling time required to disperse the catalyst and rework the material recorded. The compounds were cured in the manner described in Example I and the properties of the elastomers resulting therefrom obtained. Such values as well as the time required for remilling appear in the table below:

*Table IV*

|  | Remill Time (min.) | Post Cured Properties |||
|---|---|---|---|---|
|  |  | Hardness (Shore A) | Tensile (p.s.i.) | Elongation (percent) |
| Recipe "L" | 1.0 | 54 | 760 | 260 |
| Recipe "M" | <0.1 | 68 | 960 | 470 |

Recipe "M" prepared in accordance with the instant invention did not require remilling to obtain a workable or formable material but was milled only to the extent (less than 0.1 second) necessary to disperse the catalyst within the compound. On the other hand, Recipe "L" which is not within the scope of the present invention required a considerably longer period to obtain a workable or formable material as well as to obtain a dispersion of the catalyst within the compound. The elastomers prepared from Recipe "M" are also characterized by improved hardness, tensile strength and elongation values as compared to the elastomer prepared from Recipe "L."

EXAMPLE V

Starting with the polysiloxane gum consisting of dimethylsiloxane units and ethyl vinyl siloxane units described in Example I silicone compounds of recipes "O" and "P" were prepared by compounding the starting materials in a Banbury mixer. The recipes differ only to the extent that Recipe "P" contains an ethoxy end-blocked dimethylpolysiloxane oil.

*Recipe "O"*

100 parts of a polysiloxane gum
40 parts of finely divided silica (Santocel "CS")
1.2 parts of di-tertiarybutyl peroxide

Recipe "P"

100 parts of a polysiloxane gum
40 parts of finely divided silica (Santocel "CS")
1.2 parts of di-tertiarybutyl peroxide
12 parts of an ethoxy end-blocked dimethylpolysiloxane oil (containing an average of one ethoxy group per terminal silicon atom with the ethoxy groups comprising 12.2 percent by weight of the polysiloxane oil)

A portion of each of the silicone compounds prepared above were cured and post-cured immediately after the compounding thereof and various other portions were cured and post-cured after bin-aging periods of 7 and 21 days. The curing and post-curing procedures employed were identical to those described in Example I. The bin-aged compounds which did not contain an ethoxy end-blocked dimethylpolysiloxane oil required reworking to obtain a formable material for considerably longer periods (by factors of from 3 to 8 and higher) than the compounds prepared in accordance with my invention. The properties of the cured compounds appear in the table below:

Table V
NO BIN-AGING

|  | Hardness (Shore A) | Tensile (p.s.i.) | Elongation (percent) | Tear "Die C" (lb./in.) | Compression |
|---|---|---|---|---|---|
| Recipe "O" | 71 | 640 | 165 | 70 | Nil |
| Recipe "P" | 70 | 950 | 480 | 85 | Nil |

AFTER 7 DAYS BIN-AGING

|  | Hardness (Shore A) | Tensile (p.s.i.) | Elongation (percent) | Tear "Die C" (lb./in.) | Compression |
|---|---|---|---|---|---|
| Recipe "O" | 58 | 835 | 210 | 68 | Nil |
| Recipe "P" | 63 | 970 | 450 | 87 | Nil |

AFTER 21 DAYS BIN-AGING

|  | Hardness (Shore A) | Tensile (p.s.i.) | Elongation (percent) | Tear "Die C" (lb./in.) | Compression |
|---|---|---|---|---|---|
| Recipe "O" | 54 | 995 | 225 | 67 | Nil |
| Recipe "P" | 60 | 1,120 | 430 | 88 | Nil |

Recipe "P" which was prepared in accordance with my invention in addition to being more readily processed into a workable form possesses overall improved physical properties as compared with Recipe "O" (free of polysiloxane oil).

EXAMPLE VI

A linear polysiloxane gum consisting of dimethylsiloxane units (87.5 percent by weight), ethyl vinyl siloxane units (0.15 percent by weight), and diphenylsiloxane units (12.0 percent by weight) was employed as the starting gum in the preparation of silicone compounds of Recipes "Q" and "R" by milling procedures.

Recipe "Q"

100 parts of the polysiloxane gum
43 parts of finely divided silica (Santocel "CS")
2 parts Titania (Titanox RA)

Recipe "R"

100 parts of the polysiloxane gum
43 parts of finely divided silica (Santocel "CS")
2 parts Titania (Titanox RA)
5 parts of an ethoxy end-blocked dimethylpolysiloxane oil (containing 8.2 percent by weight of ethoxy groups and having an average of 2.0 ethoxy group per terminal silicon atom)

The silicone compounds were allowed to bin-age for a period of 2 weeks after which four parts of a paste comprising 40 percent by weight of 2,4-dichlorobenzoyl peroxide and 60 parts by weight of a silicone oil was compounded with each of the recipes on a two roll mill with the milling time required to disperse the catalyst and rework the material recorded. The compounds were cured in the manner described in Example I and the properties of the elastomers resulting therefrom noted. Such values as well as the time required for remilling appear in the table below:

Table VI

|  | Remill Time (min.) | Hardness (Shore A) | Tensile (p.s.i.) | Elongation (percent) |
|---|---|---|---|---|
| Receipe "Q" | 10 | 50 | 750 | 267 |
| Receipe "R" | 3 | 48 | 980 | 390 |

EXAMPLE VII

Starting with the polysiloxane gum consisting of dimethylsiloxane units and ethyl vinyl siloxane units described in Example I, silicone compounds of Recipes "S," "T" and "U" were prepared by milling procedures conducted on a two-roll mill.

| Recipe | Parts of Gum | Parts of Santocel "CS" | Parts of Ethoxy End-blocked oil |
|---|---|---|---|
| S | 100 | 50 | 0 |
| T | 100 | 50 | [1] 15 |
| U | 100 | 45 | [2] 15 |

[1] Ethoxy end-blocked dimethylpolysiloxane oil (containing 10 percent of ethoxy groups and having an average of one ethoxy group per terminal silicon atom).
[2] Ethoxy end-blocked dimethylpolysiloxane oil (containing 8.2 percent of ethoxy groups and having an average of two ethoxy groups per terminal silicon atom).

The above compounds were bin-aged for a period of 40 days and upon examination thereafter it was found that the compound of Recipe "S" had become a hard, brittle material showing evidence of considerable structure build-up. The compound could not be diced or worked unless it was remilled for a period of as long as 10 minutes. On the other hand, the compounds of Recipes "T" and "U" were friable materials and could be extruded, granulated, or diced without the necessity of remilling the compounds.

To a portion of the compounds identified as Recipes "S" and "T" was added, by milling procedures, 1.2 parts of di-tertiarybutyl peroxide with the time required to disperse the catalyst and obtain a workable material recorded. The compositions were cured in the manner described in Example I and the properties of the resulting elastomers listed below:

Table VII

|  | Remill Time (min.) | Hardness (Shore A) | Tensile (p.s.i.) | Elongation (percent) | Tear "Die C" |
|---|---|---|---|---|---|
| Receipe "S" | 10 | 55 | 850 | 220 | 45 |
| Receipe "T" | 2 | 66 | 1,060 | 350 | 77 |

EXAMPLE VIII

Starting with a polysiloxane gum consisting of dimethylsiloxane units (99.85 percent by weight) and ethyl vinyl siloxane units (0.15 percent by weight) silicone compounds of Recipes "W" and "X" were prepared by milling procedures.

Recipe "W"

100 parts of polysiloxane gum
50 parts of finely divided silica (Santocel "CS")

Recipe "X"

100 parts of polysiloxane gum
50 parts of finely divided silica (Santocel "CS")
15 parts of an ethoxy end-blocked dimethylpolysiloxane oil (containing 10 percent by weight of ethoxy groups and having an average of one ethoxy group per terminal silicon atom)

The compounds were allowed to bin-age for a period of 37 days after which 1.2 parts of di-tertiarybutyl peroxide was compounded with each of the recipes on a two-roll mill with the milling time required to disperse the catalyst and work the material recorded. The compounds were cured as in Example I and the properties of the elastomers listed below together with the time required for remilling:

Table VIII

|  | Remill Time (min.) | Post-Cured Properties ||||
|---|---|---|---|---|---|
|  |  | Hardness (Shore A) | Tensile (p.s.i.) | Elongation (percent) | Tear "Die C" |
| Recipe "W" | 8 | 55 | 800 | 280 | 55 |
| Recipe "X" | <1 | 60 | 945 | 385 | 85 |

EXAMPLE IX

Starting with the polysiloxane gum consisting of dimethylsiloxane units and ethyl vinyl siloxane units described in Example I, silicone compounds of Recipes "Y" and "Z" were prepared in accordance with the invention.

*Recipe "Y"*

100 parts of polysiloxane gum
48.4 parts of finely divided silica
3.2 parts of barium zirconate
14.4 parts of an ethoxy end-blocked dimethylpolysiloxane oil (containing an average of one ethoxy group per terminal silicon atom with the ethoxy groups comprising 12.2 percent by weight of the polysiloxane oil)

*Recipe "Z"*

100 parts of polysiloxane gum
55.7 parts of finely divided silica
3.7 parts of barium zirconate
16.8 parts of an ethoxy end-blocked dimethylpolysiloxane oil (containing an average of one ethoxy group per terminal silicon atom with the ethoxy groups comprising 12.2 percent by weight of the polysiloxane oil)

The above compounds were allowed to bin-age for a period of 2 weeks after which time they were found to be readily workable compositions. A milling period of less than 1 minute was required to disperse 1.2 parts of di-tertiarybutyl peroxide within the compositions. The compounds were cured in the manner described in Example I and the properties of the elastomers resulting therefrom recorded.

Table IX

|  | Hardness (Shore A) | Tensile (p.s.i.) | Elongation (percent) | Tear "Die C" |
|---|---|---|---|---|
| Recipe "Y" | 70 | 940 | 340 | 88 |
| Recipe "Z" | 82 | 840 | 275 | 92 |

EXAMPLE X

Starting with a polysiloxane gum consisting of dimethylsiloxane units (99.85 percent by weight) and ethyl vinyl siloxane units (0.15 percent by weight) silicone compounds of Recipes "AA" and "BB" were prepared by compounding the ingredients in a two-roll mill.

*Recipe "AA"*

100 parts of polysiloxane gum
20 parts of finely divided silica (Cab-O-Sil)
60 parts of calcium carbonate (Gamaco)
1 part of Titania (Titanox)

*Recipe "BB"*

100 parts of polysiloxane gum
20 parts of finely divided silica (Cab-O-Sil)
60 parts of calcium carbonate (Gamaco)
1 part of Titania (Titanox)
10 parts of an ethoxy end-blocked dimethylpolysiloxane oil (containing an average of one ethoxy group per terminal silicon atom with the ethoxy groups comprising 8.2 percent by weight of the polysiloxane oil)

The compositions were allowed to bin-age for a period of 2 weeks after which time they were examined and it was found that composition "AA" was a stiff, brittle material whereas composition "BB" was soft and pliable. To obtain a dispersion of composition "A" in toluene it was necessary to first remill the compound for a period of 5 minutes. On the other hand, composition "BB" was readily dispersed in toluene without the necessity of remilling.

To prepare silicone elastomer treated insulating tapes there was added to the dispersions of the above silicone compounds two parts of dicumyl peroxide and separate pieces of glass cloth treated with such compounds by a dipping procedure. After dipping, the treated glass cloths were allowed to drain for a period of 10 minutes, dried for a period of 5 minutes at 100° C. and finally heated for 15 minutes at 150° C. to effect curing of the deposited film of silicone compound to an elastomer. The cured cloths were then tested for crease strength and dielectric strength in accordance with the procedures outlined in the Glossary.

Table X

|  | Crease Strength of Coated Tape (lb./in.) | Dielectric Strength of Coated Tape (volt/mil) |
|---|---|---|
| Recipe "AA" | 116 | 900 |
| Recipe "BB" | 125 | 1,115 |

In addition to the improved properties of the silicone gums, compounds, and elastomers of this invention, which are illustrated by the examples above, it has been found that the improved silicone elastomers are further characterized by improved stability against depolymerization at elevated temperatures. By way of illustration, when the improved silicone elastomers are heated to temperatures which cause considerable depolymerization (or reversion) in known silicone elastomers, they have been found relatively stable as only a small amount of depolymerization or reversion occurs.

EXAMPLE XI

Starting with a polysiloxane gum identical with that disclosed in Example I, four silicone compounds comprising 100 parts of the gum and 40 parts of filler were prepared. To three of the prepared silicone compounds was added by milling procedure, 12 parts of an ethoxy end-blocked polysiloxane oil and no oil was added to the fourth silicone compound. The polysiloxane oil added to the three silicone compounds was different in each instance. One of the polysiloxane oils was an ethoxy end-blocked polysiloxane oil containing dimethylpolysiloxane units and ethyl vinyl siloxane units and having a molecular weight of about 1500 and wherein the ethyl vinyl siloxane units were present in the amount of 0.35 percent by weight. The polysiloxane oil contained an average of one ethoxy group per silicon atom. The second polysiloxane oil was comprised of dimethylsiloxane units and diphenylsiloxane units and contained an average of one ethoxy group per terminal silicon atom. There were an average of eight dihydrocarbon siloxy groups to the molecule. The third polysiloxane oil was an ethoxy end-blocked polysiloxane oil containing an average of 1.5 ethoxy groups bonded to the terminal silicon atoms thereof and containing an average of about 12 diethylsiloxy groups to the molecule.

The above silicone compounds were bin-aged for a period of 2 weeks after which 1.2 parts of di-tertiarybutyl peroxide was added thereto by milling procedures. The time required to remill each of the compounds and to disperse the catalyst was noted. The compounds were then cured in a manner described in Example I and it was found that the three silicone compounds containing polysiloxane oil not only required a much smaller amount of time to disperse the catalyst and obtain a workable compound, but in addition, had improved tensile strength and elongation properties as compared to the silicone compound free of a polysiloxane oil.

What is claimed is:

1. An improved silicone compound comprising
  (a) 100 parts by weight of a dihydrocarbon polysiloxane gum having a hydrocarbon substituent to silicon atom ratio of from 1.95 to 2.05 and whose hydrocarbon substituents comprise saturated and olefinically-unsaturated hydrocarbon substituents, said saturated hydrocarbon substituents comprising at least one member selected from the class consisting of methyl, ethyl and phenyl groups and said olefinically-unsaturated hydrocarbon substituents comprising at least one member selected from the class consisting of vinyl, allyl and cyclohexenyl groups, and wherein said olefinically-unsaturated hydrocarbon substituents are bonded to from about 0.037 to about 0.70 percent of the silicon atoms present in the dihydrocarbon polysiloxane gum,
  (b) from 4 to 50 parts by weight of a dihydrocarbon substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms thereof and
  (c) an inorganic filler.

2. A silicone compound comprising
  (a) 100 parts by weight of a dihydrocarbon polysiloxane gum having a hydrocarbon substituent to silicon atom ratio of from 1.95 to 2.05 and whose hydrocarbon substituents comprise saturated and olefinically-unsaturated hydrocarbon substituents, said saturated hydrocarbon substituents comprising at least one member selected from the class consisting of methyl, ethyl and phenyl groups and said olefinically-unsaturated hydrocarbon substituents comprising at least one member selected from the class consisting of vinyl, allyl and cyclohexenyl groups, and wherein said olefinically-unsaturated hydrocarbon substituents are bonded to from about 0.037 to about 0.70 percent of the silicon atoms present in the siloxane gum,
  (b) from about 8 to about 40 parts by weight of a dihydrocarbon substituted polysiloxane oil having a hydrocarbon substituent to silicon atom ratio of from about 1.889 to 2.0 and whose hydrocarbon substituents comprise at least one member of the class consisting of methyl, ethyl, vinyl, allyl, cyclohexenyl and phenyl groups, said polysiloxane oil containing from about 8 to 20 dihydrocarbon siloxy units per molecule and having an average of from 1 to 1.5 lower alkoxy groups bonded to each of the terminal silicon atoms of said dihydrocarbon substituted polysiloxane oil, and
  (c) an inorganic filler.

3. A silicone compound as defined in claim 2 wherein said lower alkoxy groups are ethoxy groups.

4. A silicone compound comprising
  (a) 100 parts by weight of a dihydrocarbon polysiloxane gum having a hydrocarbon substituent to silicon atom ratio of from 1.95 to 2.05 and comprised of dimethylsiloxane units and ethylvinylsiloxane units, said ethylvinylsiloxane units being present in an amount of from 0.037 to 0.70 percent of the total number of dihydrocarbon units present in said polysiloxane gum,
  (b) from about 8 to about 40 parts by weight of a dihydrocarbon-substituted oil having a hydrocarbon substituent to silicon atom ratio of from about 1.8 to 2.0 and comprised of from about 4 to 35 dimethylsiloxane units and containing an average of from about 1 to 1.5 ethoxy groups bonded to each of the terminal silicon atoms thereof, and
  (c) finely-divided silica as a filler.

5. A silicone compound comprising
  (a) 100 parts by weight of a dihydrocarbon polysiloxane gum having a hydrocarbon substituent to silicon atom ratio of from 1.95 to 2.05 and comprised of dimethylsiloxane units, diphenylsiloxane units and ethylvinylsiloxane units, said ethylvinylsiloxane units being present in an amount of from 0.037 to 0.70 percent of the total number of dihydrocarbon siloxane units present in the polysiloxane gum,
  (b) from about 8 to about 40 parts by weight of a dihydrocarbon polysiloxane oil having a hydrocarbon substituent to silicon atom ratio of from about 1.8 to 2.0 and comprised of from about 4 to 35 dimethylsiloxane units and containing an average of from 1 to 1.5 ethoxy groups bonded to each of the terminal silicon atoms thereof, and
  (c) finely-divided silica as a filler.

6. A silicone compound comprising
  (a) 100 parts by weight of a dihydrocarbon polysiloxane gum having a hydrocarbon substituent to silicon atom ratio of from 1.95 to 2.05 and comprised of dimethylsiloxane units and ethylvinylsiloxane units, said ethylvinylsiloxane units being present in an amount of from 0.037 to 0.70 percent of the total number of dihydrocarbon siloxane units present in said polysiloxane gum,
  (b) from about 8 to about 40 parts by weight of a dihydrocarbon polysiloxane oil having a hydrocarbon substituent to silicon atom ratio of from about 1.8 to 2.0 and comprised of from about 4 to 35 of dimethylsiloxane units and ethylvinylsiloxane units and containing an average of from 1 to 1.5 ethoxy groups bonded to each of the terminal silicon atoms thereof, and
  (c) finely-divided silica as a filler.

7. A silicone compound comprising
  (a) 100 parts by weight of a dihydrocarbon polysiloxane gum having a hydrocarbon substituent to silicon atom ratio of from 1.95 to 2.05 and comprised of dimethylsiloxane units and ethylvinylsiloxane units, said ethylvinylsiloxane units being present in an amount of from 0.037 to 0.70 percent of the total number of dihydrocarbon siloxane units present in said polysiloxane gum,
  (b) from about 8 to about 40 parts by weight of a dihydrocarbon polysiloxane oil having a hydrocarbon substituent to silicon atom ratio of from about 1.8 to 2.0 and comprised of from about 4 to 35 of dimethylsiloxane units and diphenylsiloxane units and containing an average of from 1 to 1.5 ethoxy groups bonded to each of the terminal silicon atoms thereof, and
  (c) finely-divided silica as a filler.

8. A silicone compound comprising
  (a) 100 parts by weight of a dihydrocarbon polysiloxane gum having a hydrocarbon substituent to silicon atom ratio of from 1.95 to 2.05 and comprised of dimethylsiloxane units and ethylvinylsiloxane units, said ethylvinylsiloxane units being present in an amount of from 0.037 to 0.70 percent of the total number of dihydrocarbon siloxane units present in said polysiloxane gum,
  (b) from about 8 to about 40 parts by weight of a dihydrocarbon polysiloxane oil having a hydrocarbon substituent to silicon atom ratio of from about 1.8 to 2.0 and comprised from about 4 to 35 of diethylsiloxane units and containing an average of from 1 to 1.5 ethoxy groups bonded to each of the terminal silicon atoms thereof, and
  (c) finely-divided silica as a filler.

9. A silicone compound comprising (a) 100 parts by weight of a dihydrocarbon polysiloxane gum having a hydrocarbon substituent to silicon atom ratio of from 1.95 to 2.05 and comprised of dimethylsiloxane units, diphenylsiloxane units and ethylvinylsiloxane units, said ethylvinylsiloxane units being present in an amount of from 0.037 to 0.70 percent of the total number of dihydrocarbon siloxane units present in the polysiloxane gum, (b) from about 8 to about 40 parts by weight of a dihydrocarbon polysiloxane oil having a hydrocarbon substituent to silicon atom ratio of from about 1.8 to 2.0 and comprised of from about 4 to 35 dimethylsiloxane units containing an average of from 1 to 1.5 ethoxy groups bonded to each terminal silicon atom thereof, and (c) finely-divided silica as a filler.

10. A heat-hardenable composition of matter comprising (a) 100 parts by weight of a dihydrocarbon polysiloxane gum having a hydrocarbon substituent to silicon atom ratio of from 1.95 to 2.05 and whose hydrocarbon substituents comprise saturated and olefinically-unsaturated hydrocarbon substituents, said saturated hydrocarbon substituents comprising at least one member selected from the class consisting of methyl, ethyl, and phenyl groups and said olefinically-unsaturated hydrocarbon substituents comprising at least one member selected from the class consisting of vinyl, allyl, and cyclohexenyl groups, and wherein said olefinically unsaturated hydrocarbon substituents are bonded to from about 0.037 to about 0.70 percent of the silicon atoms present in the dihydrocarbon polysiloxane gum, (b) from 4 to 50 parts by weight of a dihydrocarbon substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl, and phenyl groups, said polysiloxane oil containing an average of from one to two lower alkoxy groups bonded to each of the terminal silicon atoms thereof and (c) a filler, and (d) a peroxide curing agent.

11. A heat-hardenable composition of matter comprising (a) 100 parts by weight of a dihydrocarbon polysiloxane gum having a hydrocarbon substituent to silicon atom ratio of from 1.95 to 2.05 and comprised of dimethylsiloxane units and ethylvinylsiloxane units, said ethylvinylsiloxane units being present in an amount of from 0.037 to 0.70 percent of the total number of dihydrocarbon siloxane units present in said polysiloxane gum, (b) from about 8 to about 40 parts by weight of a dihydrocarbon polysiloxane oil having a hydrocarbon substituent to silicon atom ratio of from about 1.8 to 2.0 and comprised of from about 4 to 35 dimethylsiloxane units and containing an average of from 1 to 1.5 ethoxy groups bonded to each of the terminal silicon atoms thereof, and (c) finely-divided silica as a filler, and (d) ditertiary butyl peroxide as a curing agent.

12. A heat-hardenable composition of matter comprising (a) 100 parts by weight of a dihydrocarbon polysiloxane gum having a hydrocarbon substituent to silicon atom ratio of from 1.95 to 2.05 and comprised of dimethylsiloxane units and ethylvinylsiloxane units, said ethylvinylsiloxane units being present in an amount of from 0.037 to 0.70 percent of the total number of dihydrocarbon siloxane units present in said polysiloxane gum, (b) from about 8 to about 40 parts by weight of a dihydrocarbon polysiloxane oil having a hydrocarbon substituent to silicon atom ratio of from about 1.8 to 2.0 and comprised of from about 4 to 35 dimethylsiloxane units and containing an average of from 1 to 1.5 ethoxy groups bonded to each of the terminal silicon atoms thereof, and (c) finely-divided silica as a filler, and (d) benzoyl peroxide as a curing agent.

References Cited in the file of this patent
UNITED STATES PATENTS

| | | |
|---|---|---|
| 2,744,079 | Kilbourne et al. | May 1, 1956 |
| 2,819,236 | Dickmann | Jan. 7, 1958 |

UNITED STATES PATENT OFFICE
CERTIFICATION OF CORRECTION

Patent No. 2,954,357 — September 27, 1960

Frank Fekete

It is hereby certified that error appears in the above numbered patent requiring correction and that the said Letters Patent should read as corrected below.

Column 5, line 45, for "gum" read -- gums --; column 7, line 54, the formula should appear as shown below instead of as in the patent:

$$(CH_3)_3SiOSi(CH_3)_3$$

same column 7, lines 57 and 58, the formula should appear as shown below instead of as in the patent:

$$C_2H_5(C_2H_4O)_2SiOSi(OC_2H_5)_2C_2H_5$$

column 12, line 47, for "identation" read -- indentation --; line 48, for "Short" read -- Shore --.

Signed and sealed this 17th day of April 1962.

(SEAL)
Attest:

ESTON G. JOHNSON
Attesting Officer

DAVID L. LADD
Commissioner of Patents